United States Patent [19]

Ruben

[11] Patent Number: 5,450,539
[45] Date of Patent: Sep. 12, 1995

[54] APPARATUS AND METHOD OF DYNAMICALLY DISPLAYING A GRAPHIC BUTTON ON A MONITOR

[75] Inventor: Ira L. Ruben, San Jose, Calif.

[73] Assignee: Apple Computer, Inc., Cupertino, Calif.

[21] Appl. No.: 911,129

[22] Filed: Jul. 9, 1992

[51] Int. Cl.6 ............................................. G06F 15/00
[52] U.S. Cl. .................. 395/155; 395/144; 364/DIG. 1; 364/280.1
[58] Field of Search .............. 395/144, 145, 146, 147, 395/148, 155, 157, 159, 161, 700; 364/280.1

[56] References Cited

U.S. PATENT DOCUMENTS 5,267,145 11/1993 Zifferer et al. ..................... 395/155
5,276,797 1/1994 Bateman et al. .................... 395/161

OTHER PUBLICATIONS

Microsoft Corp., "Microsoft Windows User's Guide", 1990, pp. 25–28, 293.
Shneiderman et al., "Designing to Facilitate Browsing: A Look Back at the Hyperties Workstation Browser", Hypermedia, v. 3, n. 2, 1991, pp. 101–117.
Xerox Corporation, Tom Moran, Frank Halasz, Randy Trigg, Kurt VanLehn and Melissa Monty, videocassette entitled "Notecards—Part 1: Basic System and Part 2: Research Issues", May 1985, running time 51 minutes.
Now Software, Inc., "Now Utilities" Manual, pp. 4-1--4-5, 1991.

*Primary Examiner*—Heather R. Herndon
*Assistant Examiner*—Joseph R. Burwell
*Attorney, Agent, or Firm*—Blakely, Sokoloff, Taylor & Zafman

[57] ABSTRACT

A method for dynamically displaying a button on a monitor of a computer system having a graphical user interface is described. First, it is determined whether a mouse pointer is within an area of the monitor displaying text associated with a button, called a "selectable area." While the mouse pointer is within the selectable area, the button is displayed about the text without obscuring the text. Finally, if the user selects the button by clicking on the button while the button is displayed, a function associated with the text is executed.

22 Claims, 5 Drawing Sheets

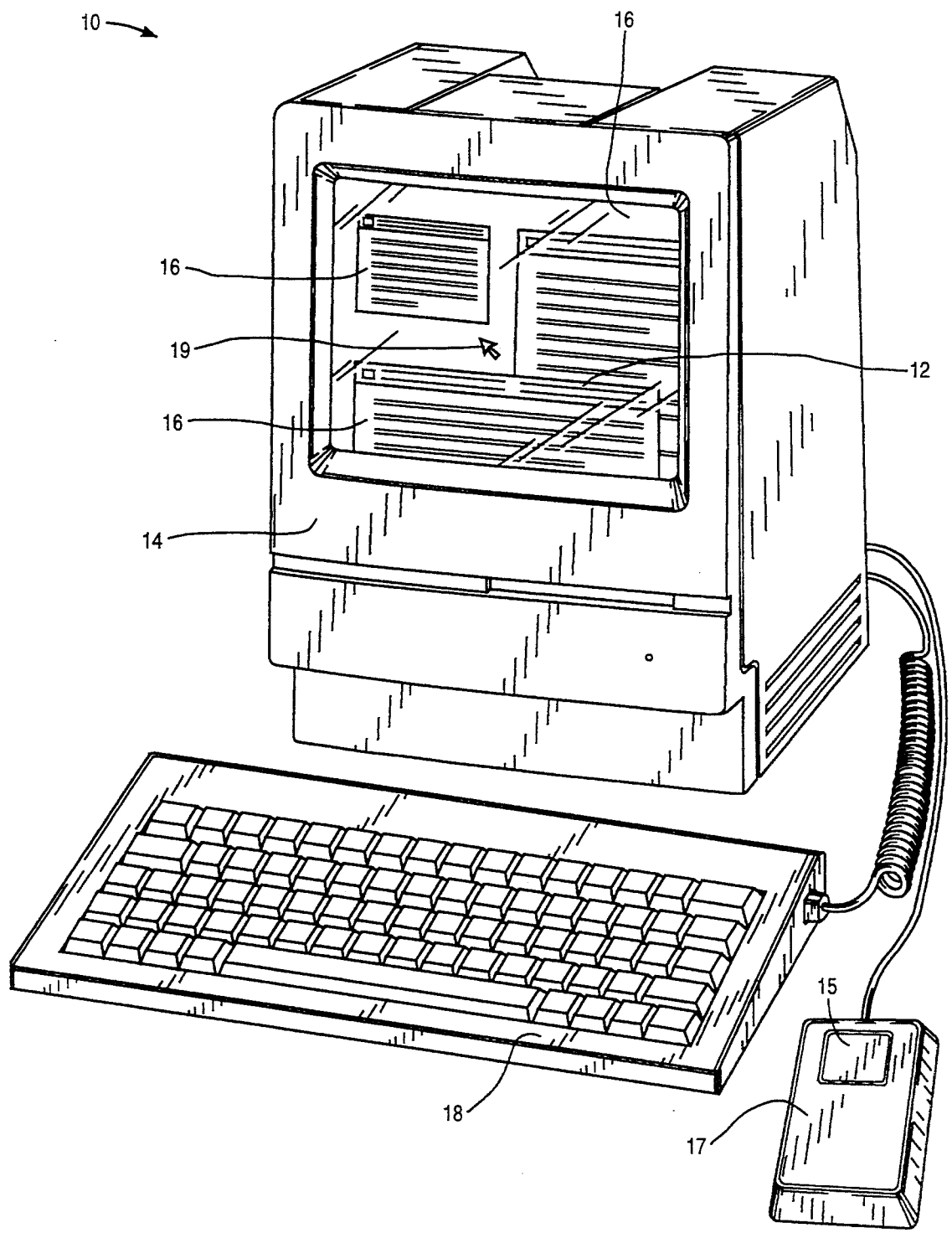
FIG_1 (PRIOR ART)

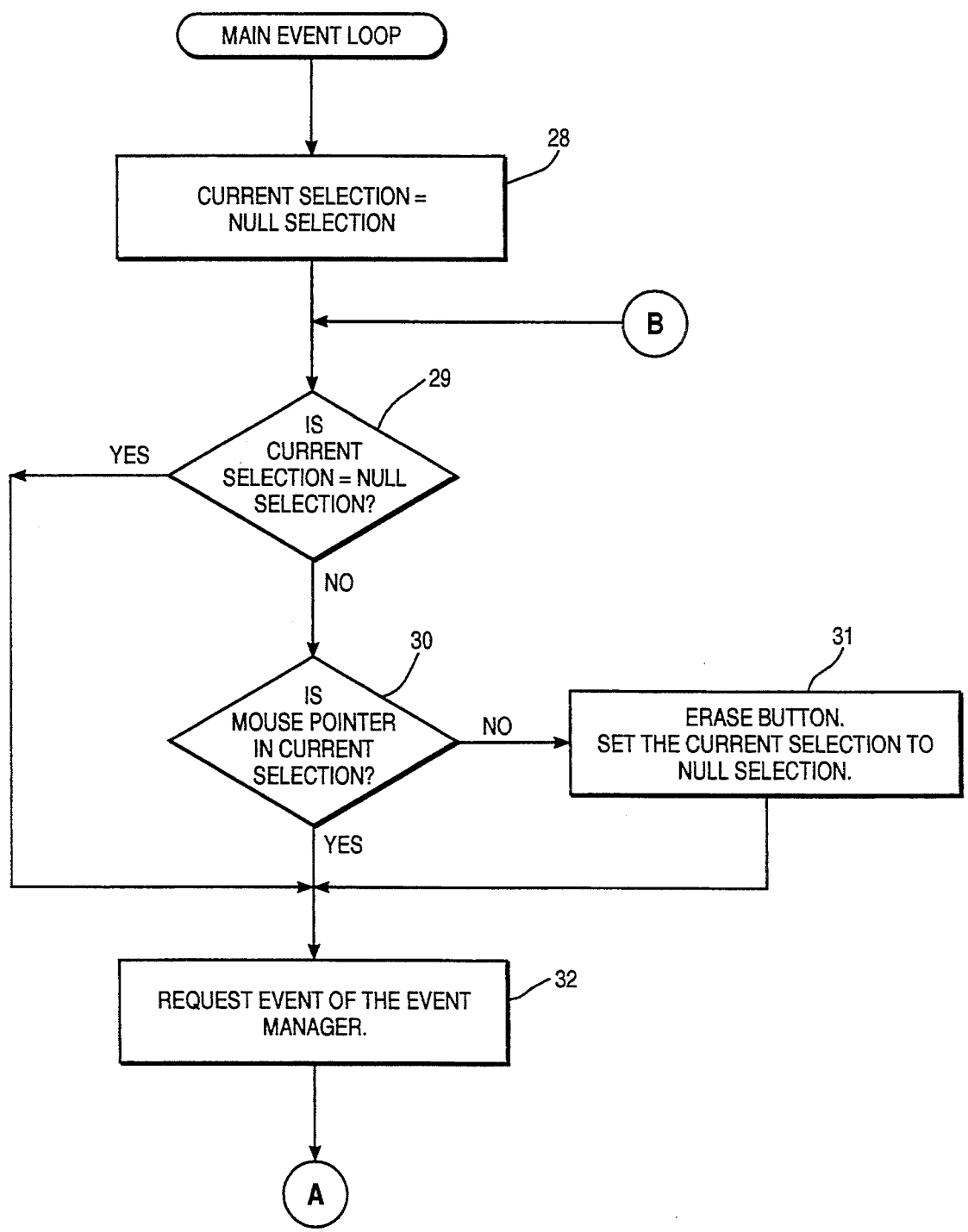
FIG_2A

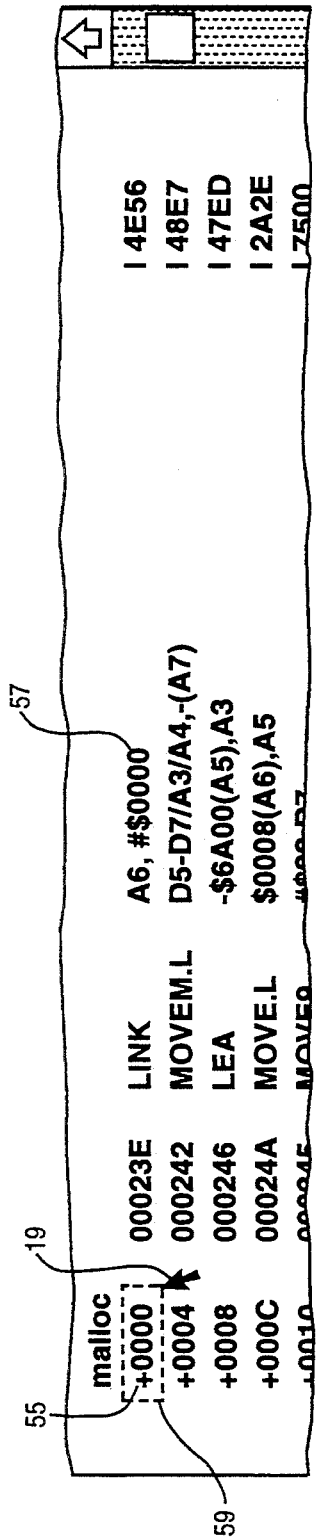

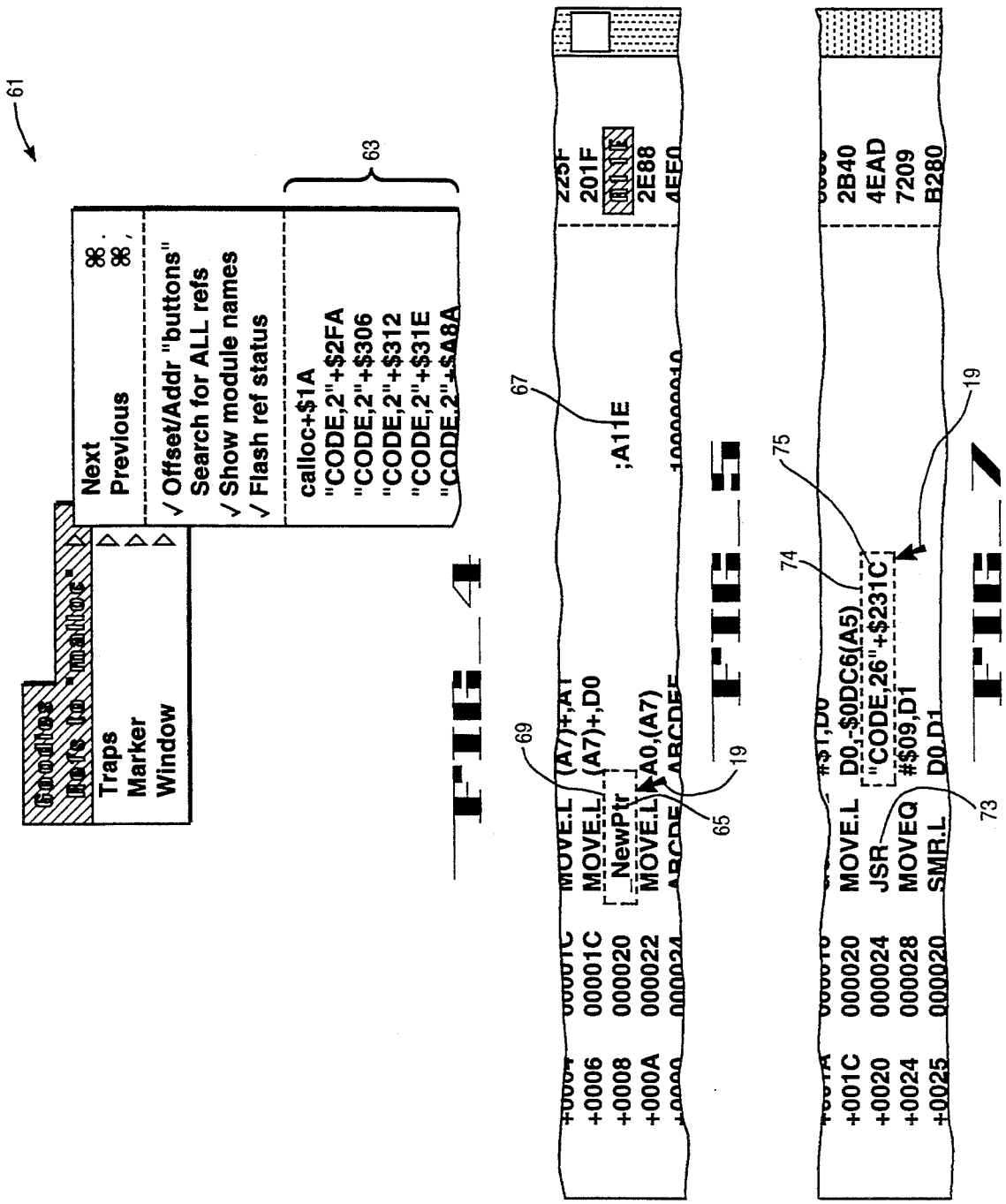

APPARATUS AND METHOD OF DYNAMICALLY DISPLAYING A GRAPHIC BUTTON ON A MONITOR

FIELD OF INVENTION

The present invention relates to user interfaces for computer systems. In particular, the present invention relates to a method of dynamically displaying a graphic button on a monitor of a computer system.

BACKGROUND OF THE INVENTION

Prior computer systems employ graphic interfaces to ease their use. Graphic interfaces allow a user to move a pointer on the monitor, via a mouse, to a demarcated "selectable area" of a monitor and click a mouse button or tap the enter key on a computer keyboard to execute a function associated with an image displayed by the area. Clicking the mouse button or tapping the enter key on the computer keyboard while the pointer is within a selectable area is known as "clicking on" the area. For example, a user may move a mouse pointer to an area displaying a disk icon and click on the area to open a window for displaying the contents of a disk represented by the icon.

Dialog boxes display messages to computer users and commonly employ buttons as a means of designating selectable areas. These designated selectable areas are known as buttons because they visually resemble the buttons on a control panel. When a dialog box is present on a computer monitor, no other function can be performed by the computer until the user clicks on the "OK" button within the dialog box, signifying that she has read the dialog message. Typically, the function associated with an "OK" button is simply going back to whatever application program was running before the dialog message was displayed to the user.

Buttons of the type used in dialog boxes are not suitable for all application programs because these buttons "lock up" the computer until the user clicks on a button. Furthermore, traditional buttons obscure the text and images beneath the button on the monitor. Finally, when it is desired to have many selectable areas, displaying many buttons simultaneously distracts the user by cluttering the monitor.

Some application programs allow the user to choose among a number of functions displayed on a menu bar located at the top edge of the monitor or displayed on a pull-down menu. While menus have an advantage over buttons because they do not continuously obscure text on the monitor, a function entry on a menu is disassociated spatially from the text associated with the function.

SUMMARY OF THE INVENTION

An object of the present invention is to provide a method of dynamically displaying graphic buttons associated with text on a monitor without obscuring text associated with the button.

Another object of the present invention is to provide many buttons within an application program without cluttering the monitor.

A still further object of the present invention is to provide buttons that allow, but do not require, action by the user.

A method for dynamically displaying a button on a monitor of a computer system having a graphical user interface is described. First, it is determined whether a mouse pointer is within an area of the monitor displaying text associated with a button. While the mouse pointer is within a selectable area associated with the text, the button is displayed near the text without obscuring the text. Finally, if the user selects the button by clicking on it while the button is displayed, a function associated with the text is executed.

Other objects, features, and advantages of the present invention will be apparent from the accompanying drawings and the detailed description that follows.

BRIEF DESCRIPTION OF THE DRAWINGS

The present invention is illustrated by way of example and not limitation in the figure of the accompanying drawings in which like references indicate similar elements and in which:

FIG. 1 is a diagram of a computer system.

FIG. 2a and 2b shows a flowchart for dynamically displaying graphic buttons.

FIG. 3 illustrates the ResEdit Code Editor "Refs to . . ." facility.

FIG. 4 illustrates the ResEdit Code Editor "Refs to . . ." submenu.

FIG. 5 illustrates the ResEdit Code Editor "Traps" facility.

FIG. 6 illustrates the ResEdit Code Editor "Jump Table" facility.

FIG. 7 illustrates the ResEdit Code Editor "Marker" facility.

DETAILED DESCRIPTION

Figure 2B:
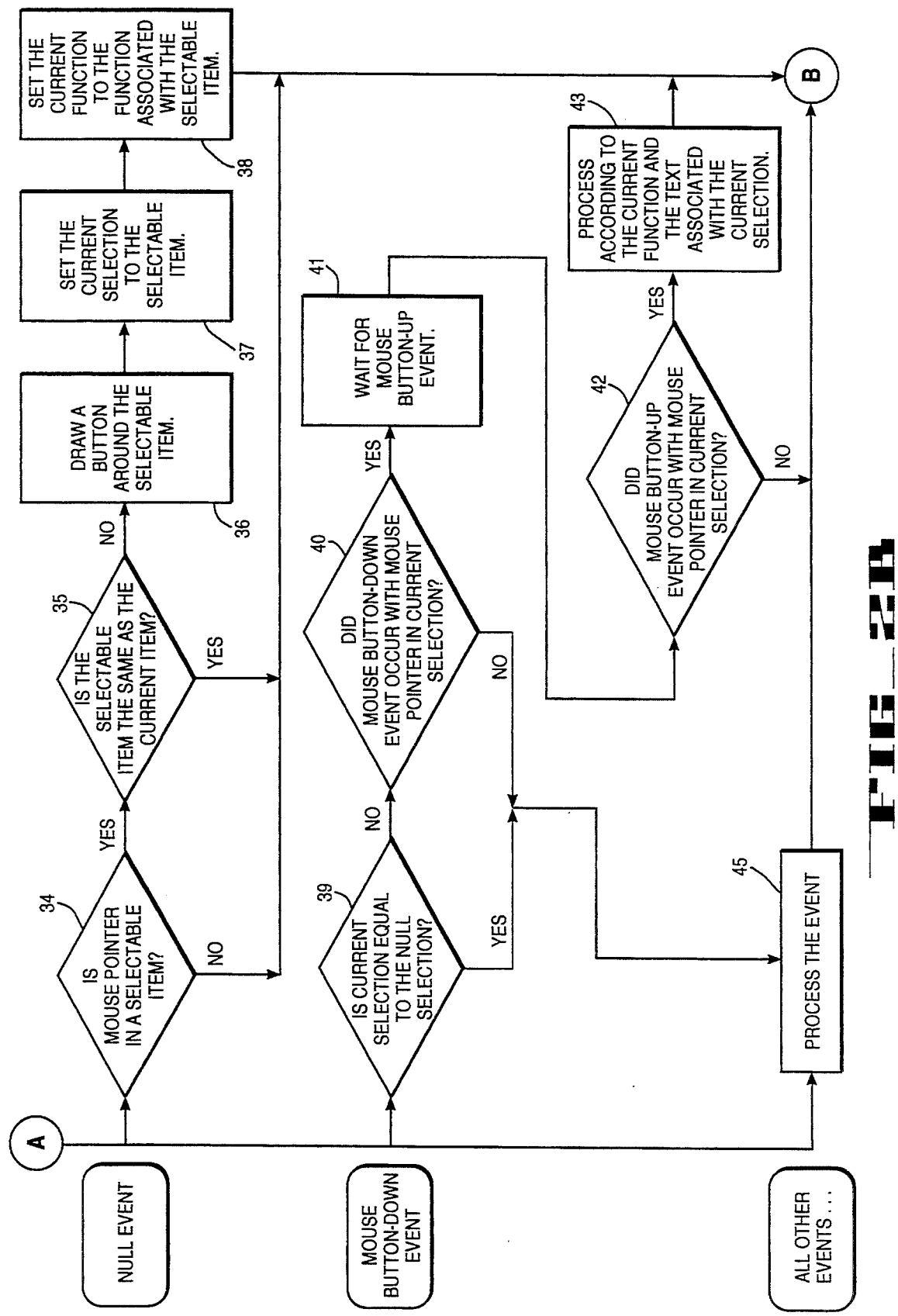

FIG. 1 illustrates a computer system 10 in which the present invention operates. Computer system 10 includes a monitor 12 for visually displaying information to a computer user, and a central processing unit (CPU) and internal memory, enclosed by housing 14. Keyboard 18 allows a computer user to provide input to the central processing unit. By moving a mouse 17 a computer user may move a pointer 19 on monitor 12 to an area displaying an object. By pressing a button 15 on the mouse 17 while the pointer 19 is in the area displaying the object, and releasing the button 15 while the pointer 19 remains in the area, the user "selects" the area. This is also known as "clicking on" the area. Computer system 10 also includes a disk drive, which reads software stored on floppy disks.

The present invention is stored in computer system 10, either within internal memory or on disk. As will be described in detail below, the present invention alters the operation of computer system 10, allowing it to dynamically display graphic buttons on monitor 12. Dynamically displaying graphic buttons allows functions to be made available to a computer user without unnecessarily cluttering the monitor 12. Dynamically displaying a button is a multistep process. First, it is determined whether the pointer 19 is within an area of the monitor displaying text associated with a button. This area is called a "selectable area." Second, while the pointer 19 is within a selectable area, the graphic button is displayed about the text without obscuring the text. Finally, if the user clicks on the graphic button while the graphic button is displayed, a function associated with the text and button is executed.

Dynamically displaying a graphic button requires the ability to track the positions of both pointer 19 and mouse button 15. It is the positions of button 15 while pointer 19 is within a selectable area that determines whether an icon has been selected. Stated another way, selecting an icon involves a mouse button-down event followed by a mouse button-up event both occurring while pointer 19 is within the selectable area.

The CPU uses an event manager within the operating system to track both mouse button events and pointer position. Because the position of pointer 19 is vital to determining whether an icon has been selected or not, the event manager reports pointer position when reporting mouse button events. If nothing has happened when the event manager is called, then the event manager reports a null event.

Dynamically displaying a graphic button also requires tracking the position of selectable items, or icons. In other words, the CPU must constantly redefine the selectable areas of the monitor 12 as selectable images, or icons, move about monitor 12. For example, the area of the monitor that must be clicked on to open a desktop trash can icon is automatically changed as the trash can icon is moved about the monitor 12. The tracking and redefining of selectable areas is handled by the operating system and will not be discussed in detail here.

Briefly described the method of FIGS. 2a and 2b involves repeatedly asking two questions. First, what is the pointer position? Second, what mouse button event has occurred? Based on the response to the first question a decision will be made whether or not to continue to display a graphic button. The action taken afterward depends upon the response to the second question. Two types of mouse button events are of particular interest. If no mouse button event, called a null event, has occurred a decision is made based upon pointer position whether to display another button or to continue to display the button already displayed. On the other hand, if a mouse button-down event occurs a decision is made whether to execute the function associated with the currently displayed button.

The CPU begins the process of displaying buttons with step 28, where the CPU initializes a variable called current button selection. The current button selection points to a single selectable area out of a multiplicity of possible selectable areas. Typically, the current button selection is set by the position of the pointer 19; however, in step 28 the current button selection is initialized to a null selection. This is because the pointer 19 may not be within a selectable area initially.

In steps 29 through 31, the CPU decides whether a button is currently displayed, and, if so, whether the button should continue to be displayed.

In step 29, the CPU checks the current button selection. If the current button selection is the null selection, no button is currently displayed, so the CPU branches to step 32. Otherwise, a button is currently displayed, and the CPU continues to step 30.

In step 30, the CPU compares the coordinates of the mouse pointer position 19 to the coordinates of the current button selection. There are two possible results of this comparison. First, the mouse pointer 19 is within the current button selection. If so, the button currently displayed should remain displayed. The CPU responds by branching to step 32. Second, the pointer 19 is no longer within the area of the current button selection. In this case, the CPU branches to step 31.

In step 31, the CPU erases the currently displayed button because the pointer 19 has moved. The CPU also resets current button selection to the null selection. The CPU then continues execution at step 32.

In step 32, an event is requested of the event manager. The remainder of the flowchart, on FIG. 2B, shows how the event received from the event manager is processed. If the event received is a null event, the CPU displays a new button if one should be displayed. If the event received is a mouse button-down event, the CPU determines whether the function associated with the button should be executed.

Null event processing begins in step 34. There the position of the mouse pointer 19 is checked to see if it is within any selectable area. The pointer 19 is not within a selectable area, a button need not be displayed, and the CPU branches back to step 29. However, if the pointer 19 is within a selectable area, execution continues in step 35.

In step 35, the current button selection is compared to the selectable area currently occupied by the mouse pointer 19 to determine if another button should be displayed. If the pointer 19 position is within the area of the current button selection no further action is required. The button displayed continues to be displayed and the CPU branches back to step 29. On the other hand, if the currently occupied selectable area is not the current button selection another graphic button is displayed in step 36.

There are many ways of drawing a button without obscuring the text associated with the button. For example, a gray lined box surrounding the text may be drawn, or the text and the background within the selectable area may be displayed in reverse video, or the text may simply be displayed in a font and/or color that distinguishes it from surrounding text.

In step 37 the current button selection is set to the selectable area displaying the graphic button just drawn in step 36. This done, processing proceeds by advancing to step 38. Changing the current button selection may change the function to be executed when the graphic button is selected. The CPU deals with this possibility in step 38 by appropriately setting a variable called the current function. As its name implies, the current function indicates the function associated with the current button selection. The CPU determines which function the current function should be set to using either the text or the selectable area associated with the current button selection. The current function appropriately set, the CPU returns to step 29.

Mouse button-down event processing begins with step 39. There, if the current button selection is the null selection, no button is currently displayed, so the user depressed the mouse button 15 to execute a function other than one associated with a graphic button. In this case, the CPU branches to step 45 to process the mouse button-down event.

In step 39 the CPU determines whether the mouse button down event relates to the dynamic display of graphic buttons. The CPU does this by examining the current button selection. If the current button selection is the null selection, the mouse button down event does not relate to the dynamic display of buttons. The CPU responds to this by proceeding to step 45. There the event is processed. On the other hand, if the current button selection is not the null selection the mouse button down event may relate to the current button selection. The CPU proceeds to step 40 to examine the issue further.

In step 40 the CPU determines whether the mouse button down event began the process of selecting the currently displayed button. The CPU makes this determination by comparing the position of the pointer 19 at the time of the mouse button down event to the coordinates of the current button selection. If the pointer 19 was not positioned within the area of the current button selection, then the mouse button down event does not relate to the present method. In this case, the CPU branches to step 45. Selection of the currently displayed graphic button has begun otherwise. The CPU responds by proceeding to step 41.

The CPU waits for a mouse button-up event, which may complete the selection process, in step 41. While the CPU waits, the image of the currently displayed button is changed to indicate its partial selection. For as long as pointer 19 remains within the selected area associated button and the mouse button is depressed, the image of the currently displayed button is inverted or highlighted. Once mouse pointer 19 moves outside the selected area, the currently displayed button ceases to be inverted or highlighted.

When a mouse button-up event occurs, the CPU branches to step 42 to compare the position of the mouse pointer 19 at the time of the mouse button-up event to the current button selection. If the pointer 19 was outside of the area of current button selection at the time of the mouse button-up event, the user did not intend to execute the function associated with the current button selection, so the CPU branches to step 29.

If, at step 42, the pointer 19 was within the current button selection when the mouse button-up event occurred, the CPU continues at step 43, where the current function is executed. The text within the currently displayed button is an input parameter to the current function. Several examples of functions and textual input parameters will be discussed later.

Finally, if the event received from the event manager at step 32 is not a mouse button-down event occurring while the mouse pointer 19 is within the current button selection, or a null event, the CPU branches to step 45 where "other event" processing occurs. After step 45, the CPU branches back to step 29.

The present invention's method of dynamically displaying buttons can be used with any computer having a graphical user interface and as part of any application program in which it is desired to associate text or an image with a function. Apple Computer's ResEdit Code Editor provides one illustrative example. Apple Computer, Inc., is located in Cupertino, Calif.

Most applications make use of many resources, such as menus, fonts, and icons, which are stored in resource files. For example, an icon resides in a resource file as a 32-by-32 bit image. An application program's code is also stored in a resource file. The ResEdit Code Editor allows a computer user to view an application's code resource in a disassembled form.

FIGS. 3–7 illustrate portions of typical Code Editor windows. The disassembled lines, including opcode, operand, and comment, are displayed in the center of the window, and the hex data associated with the lines is displayed on the right side. The lines' addresses within the code resource ("resource address") and the lines' address offsets within their module ("offset address") are displayed on the left side of the Code Editor window. Module names are shown in bold.

The Code Editor provides four facilities for viewing related pieces of code within a particular code resource. The first facility provided by the Code Editor is the "Refs to . . . " facility, which finds all lines that reference a particular location. The user specifies the location by clicking on an offset address or resource address. An offset address is designated as selectable by the appearance of a gray-lined button around it when the mouse pointer passes over it. After clicking on an offset address, the user can examine the addresses of the referencing lines, or move the display in the window to a particular referencing line. An example of the "Refs to . . . " facility is provided in FIG. 3. In this example, the offset address 55 of the LINK A6,#$0000 instruction 57 is designated by the gray-lined button 59 as associated with a function because the mouse pointer 19 is over the offset address 55. Looking now at FIG. 4 after clicking on the button containing the offset address, the "Refs To . . . " pull-down menu 61 has been accessed. The menu 61 contains a list 63 of all addresses in the currently displayed resource that contain references to the LINK A6,#$0000 instruction 57.

The second facility provided by the Code Editor is the "Traps" facility. Traps are used by a program to access operating system services, a trap number indicating the particular service to be accessed. A trap instruction is displayed by the Code Editor with a symbolic opcode in a line's opcode field. The trap number that corresponds to the opcode is displayed in the comment field. The Code Editor's "Traps" facility allows the user to move the display in the window to lines containing other trap instructions whose trap numbers are the same as that of a particular selected trap instruction. The user selects the instruction by clicking on the button containing its opcode or comment field. An opcode or comment is designated as selectable by the appearance of a gray-lined button around it as the user passes the mouse pointer over it. Again, the button is present only while the mouse pointer is over the opcode or comment field.

An example of the "Traps" facility is provided in FIG. 5. The symbolic opcode 65 of the _NewPtr trap instruction has been designated as being associated with a function by a gray-lined button 69 as the mouse pointer 19 passes over it. After clicking on the button 69, the display will move to the next _NewPtr trap instruction in the code resource. Alternatively, the A 11 E trap number 67 displayed in the comment field of the _NewPtr trap instruction would be contained in a selectable button if the mouse pointer 19 were over it.

The third facility provided by the Code Editor is the "Marker" facility, used to move to the line containing the instruction referenced by a particular selected instruction's program-counter relative operand. When a program is executing on a Macintosh computer, the computer's program counter contains the address following the address of the instruction currently executing. A program-counter relative operand contains the offset of the referenced instruction's address offset from the address following the address of the instruction containing the program-counter relative operand. Thus, an address referenced by an instruction with a program-counter relative operand is obtained by the computer, while the instruction is executing, by adding the program-counter relative operand to the program counter. The Code Editor resolves the relative operand into a reference from the beginning of the module containing the reference. To use the "Marker" facility, the user selects the referencing instruction by clicking on the button containing its operand or comment field. An operand or comment field is designated as being associated with a function by the appearance of a gray-lined button around it as the user passes the mouse pointer over it, and again, the button is visible only while the mouse pointer is over the operand or comment field.

An example of the "Marker" facility is provided in FIG. 6. In this example, the program-counter relative operand extend Selection+$001E 70 has been designated as selectable by the gray-lined button 71. After clicking on the button containing the program-counter relative operand, the display will move to the line at the address referenced by the program-counter relative operand. Alternatively, the 000034D6 resource address field of the reference 72 displayed in the comment field of the line would be selectable if the mouse pointer 19 were over it.

Finally, a fourth facility provided by the Code Editor is the "Jump Table" facility, used to move the display to the line at the address contained in a referenced jump table entry. If the disassembly shows an operand of the form "CODE,n"+$XXXX, then that is a reference to another code segment (resource) that is accessed through the Jump Table. The Code Editor resolves the Jump Table reference and displays the destination code resource (segment,n) and offset ($XXXX). To move to the line at that address, the user clicks on the resolved reference. A resolved reference is designated as being associated with a function by the appearance of a gray-lined button around it as the user passes the mouse pointer 19 over it. After clicking on the button containing the resolved operand, the display moves to the address contained in the resolved reference.

For example, in FIG. 7, the operand of the JSR instruction 73 at offset address +0020 has been resolved to code segment 26 (symbolic name "CODE") and offset address $231C. The operand is designated as selectable by a gray-lined button 74 while the mouse pointer 19 is over the operand 75. To move the display in the window to the address contained in the operand, the user clicks on the button.

Thus, a method of dynamically displaying graphic buttons has been described. The method allows buttons to be displayed on the monitor of a computer system without cluttering the monitor and without obscuring the text associated with the button. First, it is determined whether a mouse pointer is within a selectable area of the monitor associated with a button. While the mouse pointer is within the selectable area, the button is displayed about the text without obscuring the text. Finally, if the user selects the button by clicking on it while the button is displayed, a function associated with the text is executed.

In the foregoing specification, the invention has been described with specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A method of dynamically displaying a graphic button on a display device of a computer system having a graphical user interface, selection of the graphic button causing the execution of a function identified to be associated with a portion of editable text, the portion of editable text being displayed by a selectable area of the display device, the method comprising the steps of:
    a) determining whether a pointer is within the selectable area of the display device displaying the portion of editable text;
    b) displaying the button in close proximity to the portion of editable text, without obscuring the portion of editable text, while the pointer is within the selectable area;
    c) erasing the button when it is determined that the pointer is no longer within the selectable area; and
    d) executing the function associated with the portion of editable text if an execute signal is received while the pointer is within the selectable area.

2. The method of claim 1 wherein the execute signal is caused by a mouse-down event while the pointer is within the selectable area followed by a mouse-up event while the pointer is within the selectable area.

3. The method of claim 1 wherein the displaying step comprises:
    displaying a rectangle surrounding the portion of editable text.

4. The method of claim 1 wherein the displaying step comprises:
    displaying the portion of editable text in reverse video.

5. The method of claim 1 wherein the displaying step comprises:
    displaying an oval surrounding the portion of editable text.

6. The method of claim 1 wherein the portion of editable text is a portion of an output of a disassembler.

7. The method of claim 6 wherein the output of the disassembler includes a plurality of lines, each line having an offset address, and the function associated with the offset address is compiling a list of addresses of all lines that reference the offset address.

8. The method of claim 7 wherein the portion of editable text includes a resource address and the function associated with the resource address is compiling a list of addresses of all lines that reference the offset address.

9. The method of claim 6 wherein the portion of editable text includes a first symbolic opcode and the function associated with the first symbolic opcode is displaying on the display device another portion of the output of the disassembler containing a second symbolic opcode, the second symbolic opcode being identical to the first symbolic opcode.

10. The method of claim 6 wherein the portion of editable text includes an operand of a first instruction and the function associated with the operand is displaying on the display device another portion of the output of the disassembler containing an operand of a second instruction, the first instruction being identical to the second instruction and the operand of the first instruction being identical to the operand of the second instruction.

11. A method of dynamically displaying graphic buttons on a display device of a computer system, each button identified to be associated with a portion of editable text displayed on the display device, the computer system having a graphical user interface and a mouse, the mouse having a pointer displayed on the display device, the mouse having a mouse button, the method comprising the steps of:
    a) determining if the pointer is within a first selectable area displaying a first portion of editable text;
    b) displaying a first graphic button in the proximity of the first portion of editable text without obscuring the first portion of editable text while the pointer is within the first selectable area;
    c) if the pointer is no longer within the first selectable area, ceasing to display the first graphic button;

d) sensing a mouse button down event and substantially simultaneously determining a first position of the pointer;

e) waiting for a mouse button up event if the first position of the pointer is within the first selectable area;

f) determining a second position of the pointer substantially at a time of the mouse button up event; and g) executing a first function identified to be associated with the first graphic button if the second position of the pointer is within the first selectable area.

12. The method of claim 11 further comprising the steps of:

a) sensing a null mouse button event and substantially simultaneously determining a third position of the pointer;

b) determining whether the third position of the pointer is within a second selectable area;

c) determining whether the second selectable area is equal to the first selectable area;

d) if the second selectable area is not equal to the first selectable area:
   i) ceasing to display the first graphic button; and
   ii) displaying a second graphic button in the proximity of a second portion of editable text displayed by the second selectable area.

13. The method of claim 12 further comprising the step of:

continuing to display the first graphic button if the second selectable area is equal to the first selectable area.

14. The method of claim 12 further comprising the step of:

ceasing to display the first graphic button if the third position of the pointer is not within the second selectable area.

15. The method of claim 11, wherein the displaying step comprises:

displaying a rectangle surrounding the first portion of editable text identified to be associated with the first graphic button.

16. The method of claim 11 wherein the displaying step comprises:

displaying the first portion of editable text identified to be associated with the first button in reverse video.

17. The method of claim 11 wherein the displaying step comprises:

displaying an oval surrounding the first text.

18. The method of claim 13 wherein the first text is a portion of an output of a disassembler.

19. The method of claim 18 wherein the output of the disassembler includes a plurality of lines, each line having an offset address, and the function associated with the offset address is compiling a list of addresses of all lines that reference the offset address.

20. The method of claim 19 wherein the first portion of editable text includes a resource address and the function associated with the resource address is compiling a list of addresses of all lines that reference the offset address.

21. An apparatus for dynamically displaying a button on a display device of a computer system having a graphical user interface, selection of the button causing the execution of a function identified to be associated with editable text occupying an area of the display device, comprising:

a) means for determining whether a pointer is within the area of the display device containing the editable text identified to be associated with the button;

b) means for displaying the button in the proximity of the area, without obscuring the editable text, while it is determined that the pointer is within the area of the display device containing the editable text identified to be associated with the button; and c) means for executing the function identified to be associated with the button if an execute signal is received while the button is displayed.

22. A method of dynamically displaying a graphic button on a display device of a computer system having a graphical user interface, said graphical user interface providing a menu bar and a text area comprising text, a selection of the graphic button causing the execution of a function identified to be associated with a portion of the text, the portion of text being displayed by a selectable area within the text area of the display device, the method comprising the steps of:

a) determining whether a pointer is within the selectable area of the display device displaying the portion of text;

b) displaying the button in close proximity to the portion of text, without obscuring the portion of text, while the pointer is within the selectable area;

c) erasing the button when it is determined that the pointer is no longer within the selectable area; and d) executing the function associated with the button if an execute signal is received while the pointer is within the selectable area.

* * * * *